(12) United States Patent
Endo

(10) Patent No.: US 6,452,717 B1
(45) Date of Patent: Sep. 17, 2002

(54) FIBER OPTIC AMPLIFIER

(75) Inventor: Shinji Endo, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/708,609

(22) Filed: Nov. 9, 2000

Related U.S. Application Data

(63) Continuation-in-part of application No. PCT/JP00/00467, filed on Jan. 28, 2000.

(30) Foreign Application Priority Data

Feb. 5, 1999 (JP) .............................. 11-028976

(51) Int. Cl.⁷ .......................... H01S 3/00; H04B 10/12
(52) U.S. Cl. .................................. 359/337; 359/341.1
(58) Field of Search ................. 359/337, 345, 359/333, 341.1

(56) References Cited

U.S. PATENT DOCUMENTS

| | | | | |
|---|---|---|---|---|
| 5,357,334 A | * | 10/1994 | Ishiguro | ..................... 356/73.1 |
| 5,530,584 A | * | 6/1996 | Myslinski et al. | ........ 359/337.1 |
| 6,018,602 A | * | 1/2000 | Mayor | ......................... 385/27 |
| 6,205,265 B1 | * | 3/2001 | Rozelle | ....................... 385/15 |

FOREIGN PATENT DOCUMENTS

| | | |
|---|---|---|
| EP | 0 176 826 A2 | 4/1986 |
| JP | 357205703 A * | 12/1982 |
| JP | 358162907 A * | 9/1983 |
| JP | 60-187845 | 9/1985 |
| JP | 60-204640 | 10/1985 |
| JP | 61-89543 | 5/1986 |
| JP | 62-130340 | 6/1987 |
| JP | 63-70804 | 3/1988 |
| JP | 2-156136 | 6/1990 |
| JP | 5-241031 | 9/1993 |
| JP | 9-90039 | 4/1997 |
| JP | 9-230048 | 9/1997 |

OTHER PUBLICATIONS

Miloni, P.W. and Eberly, J.H. Lasers. John Wiley & Sons, New York, 1988. p. 315.*
Griscom, D.L. et al. "Model for the Dose, Dose–Rate and Temperature Dependence of Radiation–Induced Loss in Optical Fibers." IEEE Trans. Nucl. Sci. vol. 41, No. 3, Jun. 1994. pp. 523–527.*

(List continued on next page.)

Primary Examiner—Thomas H. Tarcza
Assistant Examiner—Andrew R Sommer
(74) Attorney, Agent, or Firm—McDermott, Will & Emery

(57) ABSTRACT

The present invention relates to a fiber optic amplifier comprising a structure enabling favorable signal amplification characteristics to be maintained even in an environment exposed to radiation. The fiber optic amplifier according to the present invention comprises a bleaching system for restoring glass defects generated within an optical fiber for amplification upon exposure to ultraviolet rays. This bleaching system carries out at least one of optical bleaching and thermal bleaching for the optical fiber for amplification. The optical bleaching is effected when bleaching light having a shorter wavelength shorter and a higher power than pumping light is supplied into the optical fiber for amplification, whereas the fiber optic amplifier has a structure which can introduce and eliminate the bleaching light. On the other hand, the thermal bleaching is effected by heating the optical fiber for amplification, whereas the fiber optic amplifier comprises a structure for maintaining the surface temperature of the optical fiber for amplification within a predetermined range.

15 Claims, 3 Drawing Sheets

OTHER PUBLICATIONS

Borgermans, P. and Noel, M. "Multiple Wavelength Analysis of Radiation–Induced Attenuation on Optical Fibers: A Novel Approach in Fiber Optic Dosimetry." IEEE Trans. Insturm. and Meas., vol. 47, No. 5, Oct. 1998. pp. 1255–1258.*

Leskovar, B. "Radiation Effects on Optical Data Transmission Systems." IEEE Trans. Nucl. Sci. vol. 36, No. 1, Feb. 1989. pp. 543–551.*

Evans, B. "Correlation of the Absence of the 630–nm Band with the Intensity of Photobleaching of Inoizing Radiation–Induced Loss in Undoped Silica Fibers at –55 (deg) C." J. Lightwave Tech. vol. 8, No. 9, Sep. 1990. pp. 1284–1288.*

West, R.H. "Predicting the Radiation Induced Loss in Ge Doped Optical Fibers at Different Temperatures." IEEE RADECS 1999. Sep. 1999.*

Kannan, S. et al. "Analysis of Recovery in radiation induced loss in rare–earth doped fibers through master curve / demarcation energy diagrams." OFC/IOOC 1999. pp. 93–95.*

Tighe, W. et al. "Proposed experiment to Investigate use of Heated Optical Fibers for Tokamak Diagnostics During D–T Discharges." PPPL Prepared for the DOE. pp. 1–27. Feb. 1995.*

"Optical fiber amplifiers and their applications in the measurement field", M. Yoshida, Denki Gakkai keisoku Kenkyukai shiryo, (Japan), Shadanhojin Denki Gakkai, Jul. 24, 1996, vol. IM–96, No. 38–42 44, pp. 21–30.

"Investigation of Effects of Gamma Radiation on Erbium Doped Fibre Amplifiers", R.B.J. Lewis et al., Electronics Letters, (Japan), Aug. 13, 1992, vol. 28, No. 17, pp. 1589–1591.

"Radiation exposure challenges optical–fiber performance", A. Kanofsky, Laser Focus World, (Japan), Mar. 31, 1993, vol. 29, No. 3, pp. 145, 147, 149, and 151–152.

"Hyodrogen and radiation resistance of erbium–doped fibers", C. Fukuda et al., OFC '94 Technical Digest, pp. 304–305.

* cited by examiner

FIBER OPTIC AMPLIFIER

RELATED APPLICATIONS

This is a Continuation-In-Part application of International Patent Application serial No. PCT/JP00/00467 filed on Jan. 28, 2000, now pending which in turn claims the benefit of Japanese Patent Application No. 1999-028976, filed Feb. 5, 1999, the disclosures of which Applications are incorporated by reference herein. The benefit of the filing and priority dates of the International and Japanese Applications is respectfully requested.

BACKGROUND OF THE INVENTION

1. Field of the Invention

The present invention relates to a fiber optic amplifier for amplifying signal light including one or more wavelengths within a predetermined wavelength band.

2. Related Background Art

Demands for optical amplifiers have rapidly been enhancing in order to respond to needs for increasing communications capacity, elongating repeater distances, and the like in optical communications. Among others, fiber optic amplifiers have a great merit from the viewpoint of reducing cost and enhancing functions in optical communications systems, since they can amplify signal light including one or more wavelengths within a predetermined wavelength band without converting them into electricity.

In general, a fiber optic amplifier comprises an optical fiber for amplification, doped with a rare-earth element, and a pumping light supply system for supplying pumping light to the optical fiber for amplification. The pumping light supply system usually includes a semiconductor laser, which is a pumping light source, and an optical coupler for guiding the pumping light into the optical fiber for amplification. In such a configuration, signal light is amplified within the optical fiber for amplification due to the stimulated emission light emitted from the rare-earth element excited by the pumping light. For example, the erbium-doped fiber optic amplifier whose optical fiber for amplification is doped with erbium, as a rare-earth element, collectively amplifies the signal light in a 1.55 $\mu$m wavelength band when pumping light having a wavelength of 1.48 $\mu$m or 0.98 $\mu$m is supplied thereto.

SUMMARY OF THE INVENTION

The inventors have studied the prior art mentioned above and, as a result, found problems as follows. Namely, it has been known that, when fiber optic amplifiers are utilized in an environment in which they are inevitably exposed to radiation, e.g., in the vicinity of an atomic furnace, in outer space, or the like, glass defects occur upon exposure to the radiation (see Chie Fukuda et,al., "Hydrogen and radiation resistance of erbium-doped fibers," OFC'94 Technical Digest, pp.304–305, FF3). The occurrence of such glass defects would increase transmission loss of the signal light or pumping light, thereby deteriorating signal amplification characteristics of the fiber optic amplifiers. FIG. 1 is a graph showing a measured relationship between radiation dose (rad) and transmission loss (dB/m) with respect to light having a wavelength of 1.3 $\mu$m concerning an erbium-doped optical fiber (optical fiber for amplification). The erbium-doped optical fiber used for this measurement has a relative refractive index difference of 2% with respect to a cladding, and an outside diameter of 3 $\mu$m, while being co-doped with 1.0% by weight of aluminum and 0.1% by weight of erbium.

From FIG. 1, it can be seen that the transmission loss of the optical fiber for amplification installed in a radiation environment increases as the radiation dose enhances. On the other hand, FIG. 2 is a graph showing a relationship between radiation dose and gain concerning a counter-propagating pumping type optical fiber amplifier equipped with an erbium-doped optical fiber. Here, the wavelength of pumping light is 1.48 $\mu$m, the length of the erbium-doped optical fiber is 30 $\mu$m, the wavelength of signal light is 1.55 $\mu$m, and the input power of signal light is 35 mW. From FIG. 2, it can be seen that the gain of the optical fiber decreases as the radiation dose increases.

In order to overcome problems such as those mentioned above, it is an object of the present invention to provide a fiber optic amplifier comprising a structure capable of maintaining favorable signal amplification characteristics even in an environment exposed to radiation.

The fiber optic amplifier according to the present invention is an optical apparatus for amplifying signal light including one or more wavelengths within a predetermined wavelength band, and comprises, at least, an optical fiber for amplification having an entrance end for taking in signal light from a transmission line and an exit end for sending out amplified signal light onto the transmission line, the optical fiber for amplification constituting a part of the transmission line and being doped with a rare-earth element, and a pumping light source for supplying pumping light into the optical fiber for amplification. Here, optical isolators for inhibiting unnecessary light from propagating are disposed between the entrance end of the fiber optic amplifier and the entrance end of the optical fiber for amplification, and between the exit end of the fiber optic amplifier and the exit end of the optical fiber for amplification, respectively. Also, between these optical isolators, an optical coupler for guiding the pumping light emitted from the pumping light source into the optical fiber for amplification is disposed on at least one of the entrance end side and exit end side of the optical fiber for amplification.

In particular, the fiber optic amplifier according to the present invention is characterized in that it comprises a bleaching system for carrying out bleaching for the optical fiber for amplification. Here, bleaching refers to eliminating the defects generated in the glass constituting the optical fiber for amplification upon exposure to radiation, thereby restoring its original glass structure. This bleaching system reduces the transmission loss of signal light or pumping light caused by glass defects, whereby favorable signal amplification characteristics can be maintained.

Bleaching for the optical fiber for amplification includes optical bleaching and thermal bleaching, whereas the above-mentioned bleaching system carries out at least one of the optical bleaching and thermal bleaching. Here, it is not necessary for such bleaching to be carried out continuously while the fiber optic amplifier is operating, and similar effects can also be obtained when it is carried out at predetermined intervals.

In the case where the glass defects generated within the optical fiber for amplification are to be restored by optical bleaching, it is preferred that the bleaching system include a bleaching light source for supplying bleaching light having a wavelength shorter than that of the pumping light and a power higher than that of the pumping light into the optical fiber for amplification. In this case, between the above-mentioned optical isolators, an optical coupler for guiding the bleaching light from the bleaching light source into the optical fiber for amplification is disposed on one of the entrance end side and exit end side of the optical fiber for amplification.

Here, the wavelength of the above-mentioned bleaching light lies within the range of 0.2 $\mu$m to 1.0 $\mu$m, more preferably within the range of 0.2 $\mu$m to 0.9 $\mu$m. The bleaching light is not always required to be continuous light, and may be pulse light.

Further, for carrying out optical bleaching for selectively eliminating from the transmission line the bleaching light supplied into the optical fiber for amplification, the bleaching system preferably comprises a bleaching-light-eliminating optical coupler which is disposed between the above-mentioned optical isolators so as to hold, in cooperation with the bleaching-light-introducing optical coupler, the optical fiber for amplification. Due to this configuration, the bleaching light is prevented from being emitted outside the fiber optic amplifier together with the signal light (thus reducing noise).

In the case where the glass defects generated within the optical fiber for amplification are to be restored by thermal bleaching, on the other hand, the above-mentioned bleaching system preferably includes at least a heater for heating the optical fiber for amplification. Also, in order for the surface temperature of the optical fiber for amplification, which is an object to be heated, to be maintained within a predetermined range, this bleaching system comprises a temperature sensor for detecting the surface temperature of the optical fiber for amplification and a controller for carrying out temperature control of the heater according to measurement information from the temperature sensor.

The surface temperature of a specific optical fiber for amplification lies within the range of 50° C. to 200° C., more preferably within the range of 100° C. to 150° C.

In the fiber optic amplifier according to the present invention, the bleaching system can be configured so as to be able to carry out one or both of the above-mentioned optical bleaching and thermal bleaching.

The present invention will be more fully understood from the detailed description given hereinbelow and the accompanying drawings, which are given byway of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given-by way of illustration only, since various changes and modifications within the spirit and scope of the invention will be apparent to those skilled in the art from this detailed description.

BRIEF DESCRIPTION OF THE DRAWINGS

FIGS. 4A to 4C are views showing respective configurations of a fiber optic amplifier which is an example of the fiber optic amplifier according to the present invention and comprises a bleaching system for carrying out optical bleaching, a fiber optic amplifier which is another example of the fiber optic amplifier according to the present invention and comprises a bleaching system for carrying out thermal bleaching, and a fiber optic amplifier which is prepared as a comparative example and comprises no bleaching system.

DESCRIPTION OF THE PREFERRED EMBODIMENTS

In the following, embodiments of the fiber optic amplifier according to the present invention will be explained with reference to FIGS. 3, 4A, 4B, and 4C. Here, in the explanation of the drawings, constituents identical to each other will be referred to with numerals identical to each other without repeating their overlapping descriptions.

Figure 1:
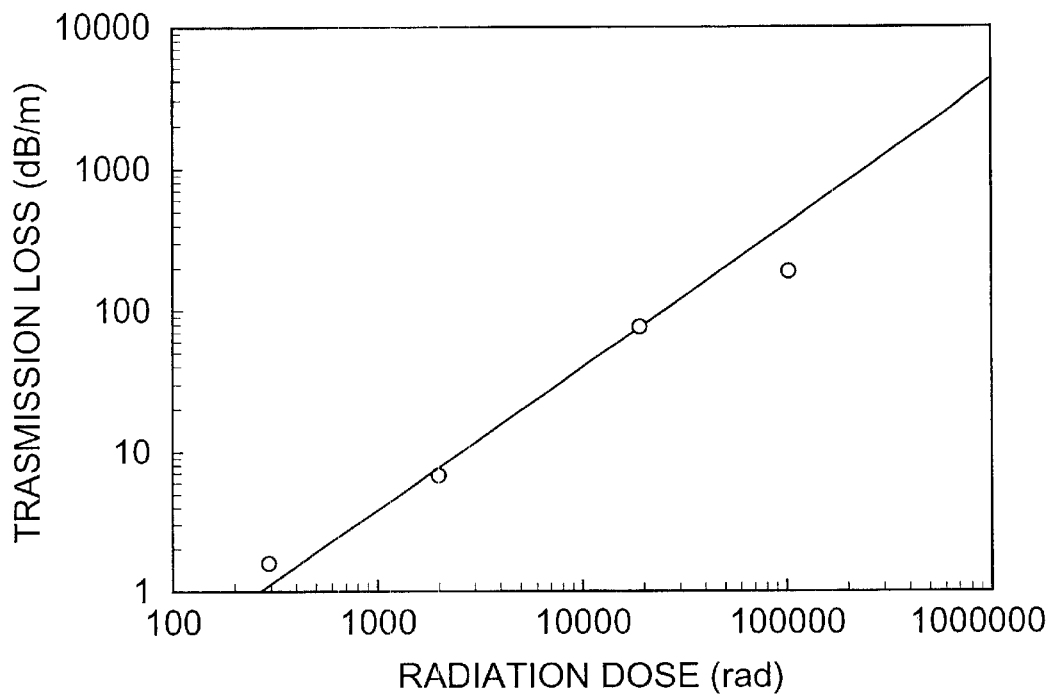
FIG. 1 is a graph showing a relationship between the transmission loss and radiation dose concerning an optical fiber for amplification.
Figure 2:
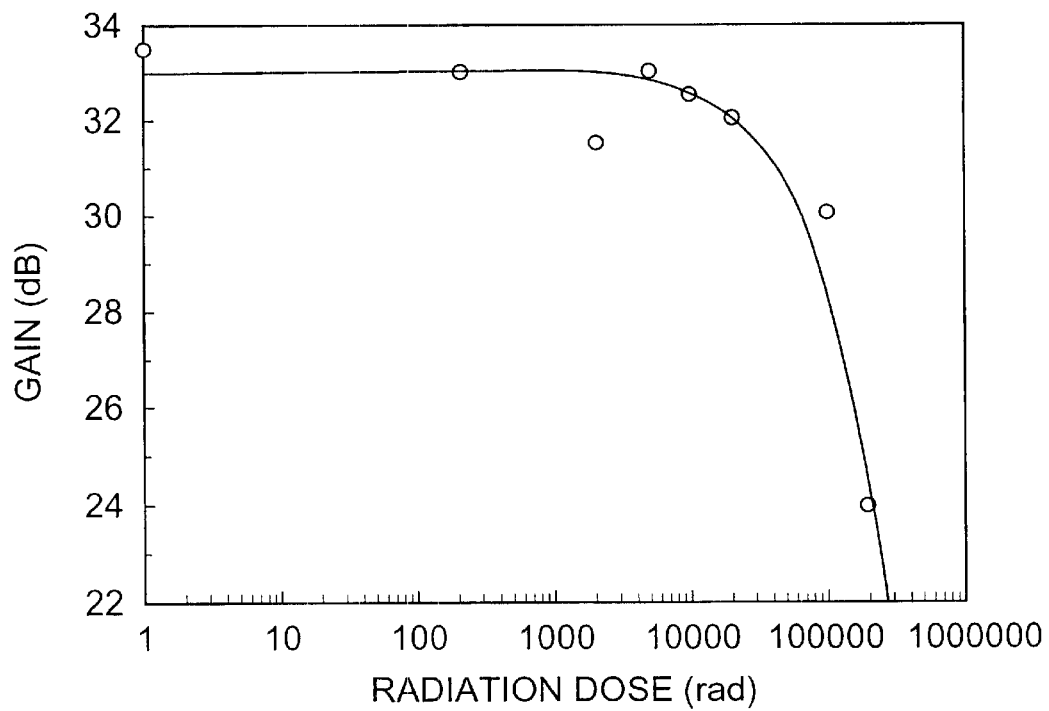
FIG. 2 is a graph showing a relationship between the gain of a fiber optic amplifier and the radiation dose to which the optical fiber for amplification is exposed.
Figure 3:
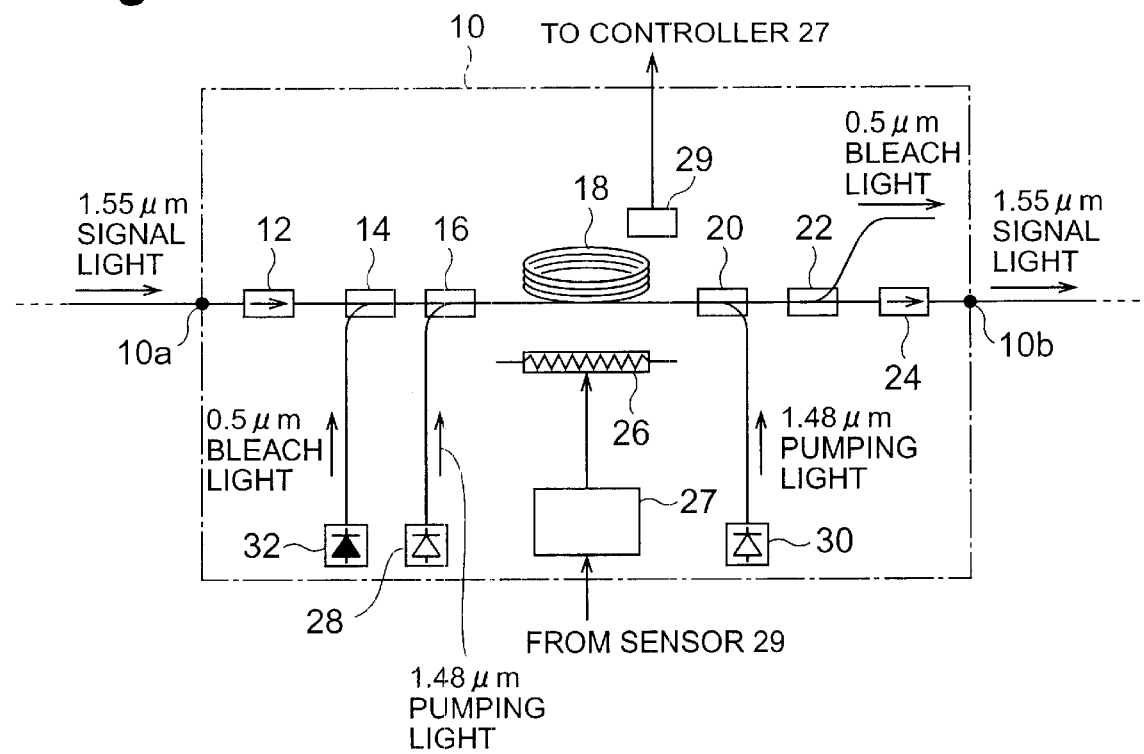
FIG. 3 is a view showing a schematic configuration of an embodiment of the fiber optic amplifier according to the present invention.

FIG. 3 is a view showing a schematic configuration of an embodiment of the fiber optic amplifier according to the present invention. In FIG. 3, the fiber optic amplifier 10 has an input end 10a and an output end 10b, between which an optical fiber for amplification 18 constituting a part of a transmission line is disposed. Between the entrance end 10a of the amplifier 10 and the entrance end of the optical fiber for amplification 18, an optical isolator 12, an optical coupler 14, and an optical coupler 16 are successively disposed in the advancing direction of signal light. Between the exit end 10b of the amplifier 10 and the exit end of the optical fiber for amplification 18, on the other hand, an optical coupler 20, an optical coupler 22, and an optical isolator 24 are successively disposed in the advancing direction of signal light. The optical coupler 14 functions so as to guide the bleaching light emitted from a bleaching light source (semiconductor laser) 32 into the optical fiber for amplification 18, whereas the optical couplers 16, 20 function to guide the respective pumping light emitted from pumping light sources (semiconductor lasers) 28, 30 into the optical fiber for amplification 18.

The optical fiber for amplification 18 is a silica-based optical fiber, whose core is doped with a rare-earth element. The doped rare-earth element is excited by the pumping light outputted from the semiconductor lasers 28, 30; and, as the signal light taken in via the input end 10a is incident thereon, stimulated emission light having a wavelength substantially identical to the signal light is released therefrom. Examples of such a rare-earth element include erbium (Er), neodymium (Nd), praseodymium (Pr), thulium (Tm), and the like. In the case where erbium is utilized as a doping element, erbium element is pumped by pumping light having a wavelength of 1.48 $\mu$m or pumping light having a wavelength of 0.98 $\mu$m. When signal light in a 1.55 $\mu$m wavelength band is incident on erbium element while the latter is in a pumped state, stimulated emission light in the 1.55 $\mu$m wavelength band is released within the optical fiber for amplification 18, whereby the signal light is amplified. Here, since the 1.55 $\mu$m wavelength band is the wavelength band with the lowest loss in silica-based optical fibers, signal light in the 1.55 $\mu$m wavelength band is often utilized in optical communications. Therefore, fiber optic amplifiers employing an erbium-doped optical fiber as the optical fiber for amplification 18 have a very wide range of uses. Also, the optical fiber for amplification 18 has a predetermined length (e.g., 30 m) in order to secure a desired amplification factor, and is accommodated within a package while in a state wound like a coil.

The optical coupler 16 disposed between the entrance end of the optical fiber for amplification 18 and the input end 10a of the amplifier 10 functions so as to multiplex the incident signal light and bleaching light and the pumping light emitted from the optical semiconductor laser 28 (hereinafter referred to as co-propagating pumping light), and guide thus multiplexed light into the optical fiber for amplification 18. On the other hand, the optical coupler 20 disposed between the exit end of the optical fiber for amplification 18 and the output end 10b of the amplifier 10 functions so as to transmit therethrough the signal light and bleaching light propagated through the optical fiber for amplification 18 and guide the pumping light emitted from the semiconductor laser 30 (hereinafter referred to as counter-propagating pumping light) into the optical fiber for amplification 18.

Here, an optical coupler in which a dielectric multilayer filter made of alternately stacked two kinds of materials having different refractive indices is inserted, for example, can be utilized as the optical couplers 16, 20. The semiconductor lasers 28, 30 output predetermined wavelengths of pumping light which are substantially identical to each other. For example, in the case where an erbium-doped optical fiber having a core doped with erbium element is employed as the optical fiber for amplification 18, doped erbium element will be pumped if pumping light having a wavelength of 1.48 $\mu$m or a wavelength of 0.98 $\mu$m is supplied into the erbium-doped optical fiber. Also, due to the above-mentioned configuration, the co-propagating, pumping light emitted from the semiconductor laser 28 is separated from the main line (the line through which the signal light propagates) by the optical coupler 20 and advances toward the semiconductor laser 30, whereby it would not be sent out into the transmission line by way of the exit end 10b. Similarly, the counter propagating pumping light emitted from the semiconductor laser 30 is separated from the main line by the optical coupler 16 and advances toward the semiconductor laser 28, whereby it would not be sent out onto the transmission line by way of the entrance end 10a.

The optical coupler 14 disposed between the entrance end 10a of the amplifier 10 and the optical coupler 16 functions so as to multiplex the signal light taken in via the input end 10a and the bleaching light emitted from the semiconductor laser 32 and guide thus multiplexed light to the optical coupler 16. On the other hand, the optical coupler 22 disposed between the optical coupler 20 and the exit end 10b of the amplifier 10 functions so as to selectively separate the bleaching light from the multiplexed light of signal light and bleaching light having passed through the optical coupler 20, and guide only the signal light to the isolator 24. Namely, the optical coupler 14, the semiconductor laser 32, and the optical coupler 22 constitute a bleaching system for carrying out optical bleaching for the optical fiber for amplification 18. For example, an optical coupler in which a dielectric multilayer filter made of alternately stacked two kinds of materials having different refractive indices is inserted can be utilized as the optical couplers 14, 22. The semiconductor laser 32 emits, as continuous light or pulse light, bleaching light for carrying out the bleaching of the optical fiber for amplification 18. For example, in the case where a silica-based optical fiber is employed as the optical fiber for amplification 18, very efficient optical bleaching can be carried out if the semiconductor laser 32 emitting bleaching light within a wavelength range of 0.2 to 1.0 $\mu$m, preferably at a wavelength of 0.5 $\mu$m, is employed. When the use of pumping light having a wavelength of 9.8 $\mu$m is taken into consideration, the wavelength of bleaching light more preferably lies within a wavelength range of 0.2 to 9.0 $\mu$m.

The optical isolators 12, 24, which transmit therethrough the light advancing from the entrance end 10a toward the exit end 10b but block the light advancing from the exit end 10b toward the entrance end 10a, are disposed between the entrance end 10a of the amplifier 10 and the optical coupler 14, and between the exit end 10b and the optical coupler 22, respectively. Namely, the optical isolator 12 transmits therethrough the signal light taken in via the input end 10a toward the optical fiber for amplification 18, and blocks the light advancing from the exit end 10b toward the entrance end 10a such as the counter-propagating pumping light emitted from the semiconductor laser 30 or the signal light and the like reflected by other optical components. On the other hand, the optical isolator 24 transmits therethrough the signal light propagated through the optical fiber for amplification 18 toward the exit end 10b, and blocks the light advancing from the exit end 10b toward the entrance end 10a such as the noise entering from the exit end 10b.

Disposed in the vicinity of the optical fiber for amplification 18 is a heater 26 for heating the optical fiber for amplification 18 so as to carry out thermal bleaching. This heater 26 may be arranged so as to heat the optical fiber for amplification 18 from outside the package accommodating the optical fiber for amplification 18. For example, in the case where a silica-based optical fiber is employed as the optical fiber for amplification 18, efficient thermal bleaching can be effected if the optical fiber for amplification 18 is heated to such an extent that its surface temperature lies within the range of 50° C. to 200° C., preferably within the range of 100° C. to 150° C. Here, the surface temperature of the optical fiber for amplification 18 or the temperature of the atmosphere in the vicinity of the optical fiber for amplification 18 is monitored by a temperature sensor 29, and temperature management is carried out by a controller 27 according to a result of measurement from the temperature sensor 29. The heater 26, controller 27, and temperature sensor 29 constitute a thermal bleaching system.

Operations and effects of the fiber optic amplifier according to this embodiment will now be explained. In the case where a fiber optic amplifier in which an optical fiber (optical fiber for amplification) doped with a rare-earth element is employed as optical amplification means is utilized in an environment exposed to radiation, glass defects occur within the optical fiber for amplification upon exposure to the radiation, whereby signal amplification characteristics of the fiber optic amplifier may deteriorate.

For this matter, the fiber optic amplifier 10 according to this embodiment comprises the optical bleaching system constituted by the semiconductor laser 32, optical coupler 14, and optical coupler 22; or the thermal bleaching system constituted by the heater 26, controller 27, and temperature sensor 29.

In the optical-bleaching system in this embodiment, the bleaching light emitted from the semiconductor laser 32 is made incident on the optical fiber for amplification 18 via the optical coupler 16. When the bleaching light enters the optical fiber for amplification 18, a part of the glass defects generated upon exposure to radiation is restored. Therefore, such optical bleaching reduces the transmission loss in signal light or pumping light caused by the glass defects, thereby making it possible to maintain favorable signal amplification characteristics even in an environment exposed to radiation. Also, efficient bleaching is possible if the bleaching of the optical fiber for amplification 18 is effected by optical bleaching.

In particular, the optical bleaching system in this embodiment can be constructed easily since it is constituted by the semiconductor laser 32, the optical coupler 14, and the optical coupler 22. Also, since the bleaching light from the semiconductor laser 32 is guided to the optical fiber for amplification 18 by way of the optical coupler 14, bleaching can be carried out in parallel with the operation of amplifying the signal light without separating the optical fiber for amplification 18 from the transmission line, whereby the maintenance of the fiber optic amplifier 10 can be carried out quite easily and quickly.

Further, the optical bleaching system in this embodiment comprises the optical coupler 20, which selectively eliminates the bleaching light from the combined wave of signal light and bleaching light propagated through the optical fiber for amplification 18 (whereby only the signal light passes therethrough). Therefore, the bleaching light is prevented from being sent out to the transmission line via the exit end 10b together with the signal light, whereby signals can be outputted with less noise.

On the other hand, the thermal bleaching system in this embodiment is constituted by the heater 26 and its control system (the temperature sensor 29 and the controller 27). In this thermal bleaching, the optical fiber for amplification 18 is heated with the heater 26, whereby a part of the glass defects generated upon exposure to radiation is restored as in the above-mentioned optical bleaching. As a result, the transmission loss in signal light or pumping light caused by the glass defects is reduced by the thermal bleaching, whereby favorable signal amplification characteristics can be maintained. Such thermal bleaching also enables the bleaching of the optical fiber for amplification 18 in a simple apparatus configuration.

Though the fiber optic amplifier 10 according to the above-mentioned embodiment comprises both of the optical bleaching system and thermal bleaching system, it may comprise only one of them.

Also, while the fiber optic amplifier 10 according to the above-mentioned embodiment comprises both of the co-propagating pumping light supply system, constituted by the semiconductor laser 28 and the optical coupler 16, for supplying the co-propagating pumping light to the optical fiber for amplification 18 constituting a part of the transmission line, and the counter-propagating pumping light supply system, constituted by the semiconductor laser 30 and the optical coupler 20, for supplying the counter-propagating pumping light to the optical fiber for amplification 18 constituting a part of the transmission line, it may comprise only one of these pumping light supply systems.

Though the optical bleaching system in the fiber optic amplifier 10 according to the above-mentioned embodiment is configured so as to guide the bleaching light into the optical fiber for amplification 18 from the entrance end side thereof by using the semiconductor laser 32 and the optical coupler 14, it may be configured so as to guide the bleaching light into the optical fiber for amplification 18 from the exit end side thereof. Also, it may be configured such that the bleaching light can be made incident on the optical fiber for amplification 18 from both of the entrance end side and exit end side thereof.

Further, the entry of bleaching light or heating of the optical fiber for amplification 18 may be carried out intermittently or periodically.

Results of measurement of signal amplification characteristics of the fiber optic amplifier according to the present invention in a radiation environment will now be explained.

Figure 4A:
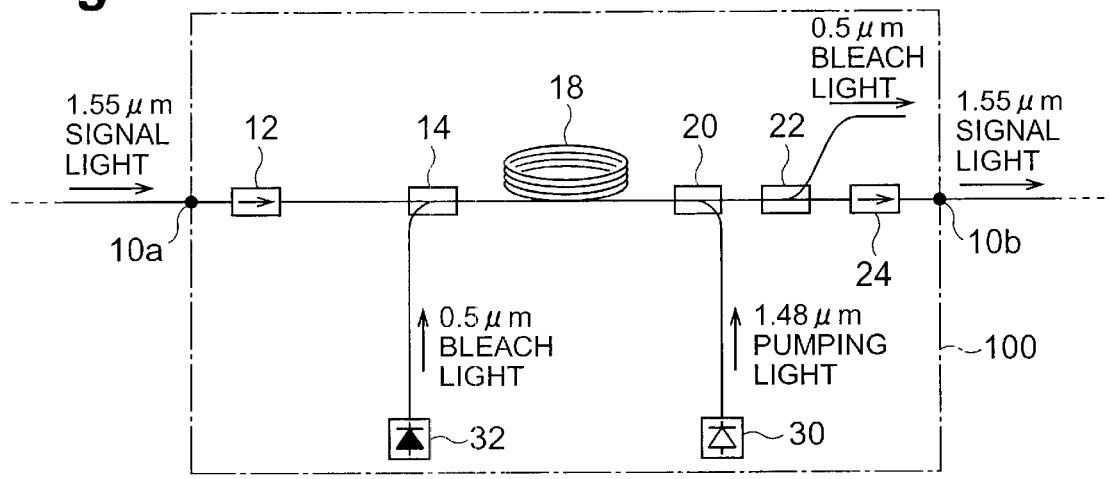
FIGS. 4A to 4C are views showing respective configurations of fiber optic amplifiers prepared for experiments for measuring bleaching effects; namely.
Figure 4B:
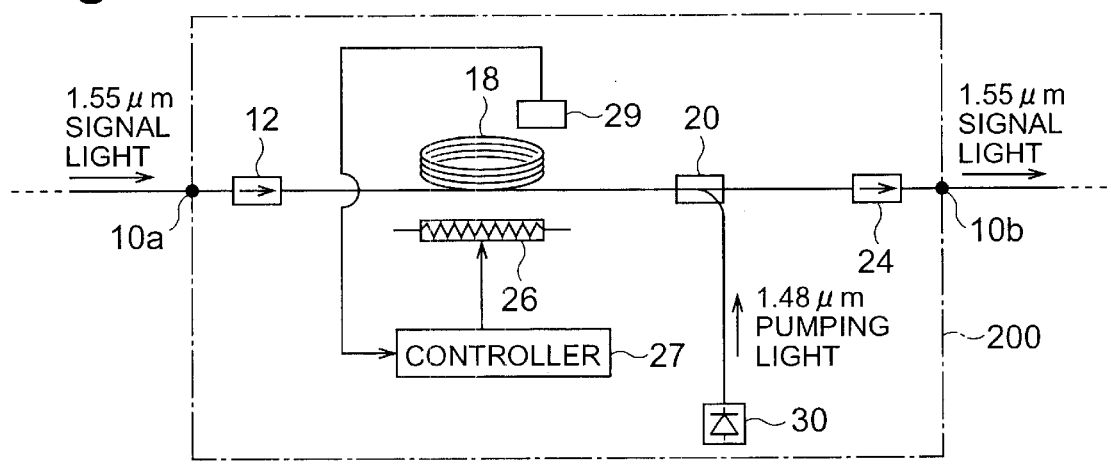
Figure 4C:
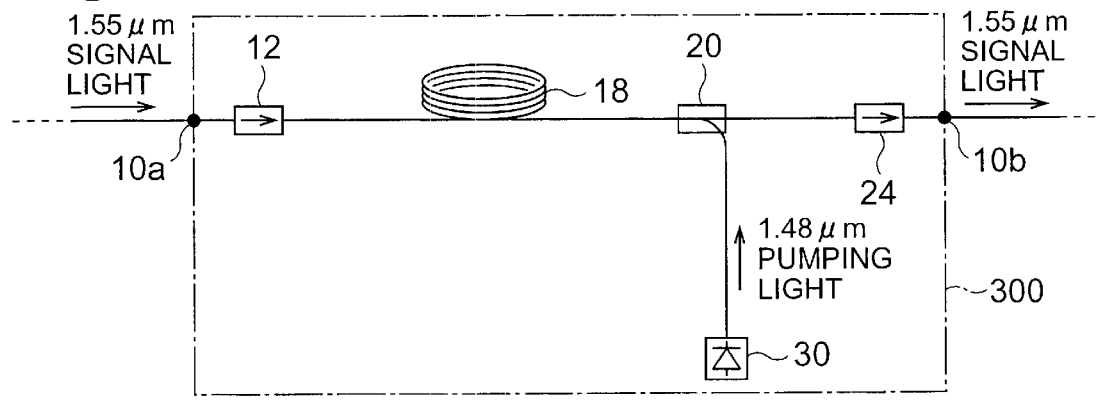

Prepared are three kinds of fiber optic amplifiers, i.e., a fiber optic amplifier 100 comprising an optical bleaching system (including a semiconductor laser 32, an optical coupler 14, and an optical coupler 22) as shown in FIG. 4A, a fiber optic amplifier 200 comprising a thermal bleaching system (including a heater 26, a temperature sensor 29, and a controller 27) as shown in FIG. 4B, and a fiber optic amplifier 300 as a comparative example comprising neither an optical bleaching system nor a thermal bleaching system as shown in FIG. 4C.

Each of thus prepared fiber optic amplifiers 100, 200, 300 is a counter-propagating pumping type optical fiber amplifier comprising, a semiconductor laser 30 and an optical coupler 20.

In each of the prepared fiber optic amplifiers 100, 200, 300, the optical fiber for amplification 18 is an erbium-doped optical fiber which is co-doped with 1.0% by weight of aluminum and 0.1% by weight of erbium. The optical fiber for amplification 18 has a total length of 30 m and is wound like a coil. Emitted from the semiconductor laser 30 is counter-propagating pumping light having a wavelength of 1.48 $\mu$m and an output of 35 mW. From the input end 10a, signal light having a wavelength of 1.55 $\mu$m and an input power of −35 dB is taken in.

In the prepared optical fiber amplifier 100, bleaching light having a wavelength of 0.5 $\mu$m and an output of 50 mW is continuously emitted from the semiconductor laser 32. In the prepared optical fiber amplifier 200, the surface temperature of the optical fiber for amplification 18 is set to about 100° C. with the heater 26. The fiber optic amplifier 300 prepared as the comparative example comprises neither an optical bleaching system nor a thermal bleaching system.

The measurement of signal amplification characteristics was carried out by measuring respective gains of the fiber optic amplifiers 100, 200, 200 having the configurations mentioned above with respect to light having a wavelength of 1.55 $\mu$m after each of the fiber optic amplifiers 100, 200, 300 had been used for 200 hours in a radiation environment of 1000 rad/h. As a result, the gain of the fiber optic amplifier 100 was 33 dB, the gain of the fiber optic amplifier 200 was 29 dB, and the gain of the fiber optic amplifier 300 was 24 dB. From these results of measurement, it was confirmed that the fiber optic amplifiers 100, 200 according to these examples were able to maintain favorable signal amplification characteristics even in the radiation environment, as compared with the fiber optic amplifier 300 of the comparative example. Here, the transmission loss of the optical fiber for amplification in the fiber optic amplifier 300 of the comparative example was 810 dB at a wavelength of 1.3 $\mu$m.

In accordance with the present invention, as explained in the foregoing, the bleaching system enabling optical bleaching or thermal bleaching for an optical fiber for amplification can restore a part of glass defects generated in the optical fiber for amplification upon exposure to radiation. As a result, the transmission loss in signal light or pumping light caused by the glass defects can be reduced, whereby favorable signal amplification characteristics can be maintained even in a radiation environment.

Also, since the optical bleaching supplies bleaching light into the optical fiber for amplification by way of an optical coupler in the present invention, the bleaching of the optical fiber for amplification can efficiently be carried out even during an operation of amplifying the signal light. Further, since there is provided an optical coupler for separating the bleaching light propagated through the optical fiber for amplification from the main line through which the signal light propagates, the bleaching light is prevented from mingling with the signal light and being sent out onto the transmission line, whereby a fiber optic amplifier with less noise is realized.

On the other hand, the thermal bleaching in the present invention can be realized when the optical fiber for amplification is heated directly or indirectly by way of a fiber-accommodating package, whereby bleaching of the optical fiber for amplification can be carried out in a simple configuration.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A fiber optic amplifier comprising:

an optical fiber for amplification, doped with a rare-earth element;

a pumping light source for supplying pumping light into said optical fiber for amplification; and a bleaching system for carrying out bleaching for said optical fiber for amplification.

2. A fiber optic amplifier according to claim 1, wherein said bleaching system includes a bleaching light source for supplying bleaching light into said optical fiber for amplification, said bleaching light having a shorter wavelength and a higher optical power than said pumping light.

3. A fiber optic amplifier according to claim 2, wherein said bleaching light has a wavelength within a range of 0.2 $\mu$m to 1.0 $\mu$m.

4. A fiber optic amplifier according to claim 3, wherein said bleaching light has a wavelength within a range of 0.2 $\mu$m to 0.9 $\mu$m.

5. A fiber optic amplifier according to claim 2, wherein said bleaching system comprises a structure for selectively eliminating said bleaching light supplied into said optical fiber for amplification.

6. A fiber optic amplifier according to claim 1, wherein said bleaching system includes a heater for heating said optical fiber for amplification.

7. A fiber optic amplifier according to claim 6, wherein said bleaching system heats said optical fiber for amplification such that at least surface temperature thereof lies within a range of 50°0 C. to 200° C.

8. A fiber optic amplifier according to claim 7, wherein said bleaching system heats said optical fiber for amplification such that at least surface temperature thereof lies within a range of 100° C. to 150° C.

9. A fiber optic amplifier comprising:

an optical fiber for amplification, doped with a rare-earth element;

a pumping light source for supplying pumping light into said optical fiber for amplification; and a bleaching system for carrying out bleaching for said optical fiber for amplification, said bleaching system including a bleaching light source for supplying bleaching light into said optical fiber for amplification, said bleaching light having a shorter wavelength and a higher optical power than said pumping light.

10. A fiber optic amplifier according to claim 9, wherein said bleaching light has a wavelength within a range of 0.2 $\mu$m to 1.0 $\mu$m.

11. A fiber optic amplifier according to claim 10, wherein said bleaching light has a wavelength within a range of 0.2 $\mu$m to 0.9 $\mu$m.

12. A fiber optic amplifier according to claim 10, wherein said bleaching system comprises a structure for selectively eliminating said bleaching light supplied into said optical fiber for amplification.

13. A fiber optic amplifier according to claim 9, wherein said bleaching system includes a heater for heating said optical fiber for amplification.

14. A fiber optic amplifier according to claim 13, wherein said bleaching system heats said optical fiber for amplification such that at least surface temperature thereof lies within a range of 50° C. to 200° C.

15. A fiber optic amplifier according to claim 14, wherein said bleaching system heats said optical fiber for amplification such that at least surface temperature thereof lies within a range of 100° C. to 150° C.

* * * * *